Nov. 24, 1931.  A. F. MASURY  1,833,052
ENDLESS TRACK
Filed Jan. 23, 1931   2 Sheets-Sheet 1

INVENTOR
Alfred F. Masury,
BY
Redding, Greeley, O'Shea & Campbell
HIS ATTORNEYS

Nov. 24, 1931.  A. F. MASURY  1,833,052
ENDLESS TRACK
Filed Jan. 23, 1931   2 Sheets-Sheet 2

INVENTOR
Alfred F. Masury,
BY
Redding, Greeley, O'Shea + Campbell
HIS ATTORNEYS

Patented Nov. 24, 1931

1,833,052

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

ENDLESS TRACK

Application filed January 23, 1931. Serial No. 510,603.

The present invention relates to endless tracks for motor vehicles and embodies, more specifically, an improved endless track construction wherein the elements of the track are so articulated as to provide a maximum degree of flexibility coupled with great strength and lightness of weight.

In existing track structures of this character, the elements constituting the track have been formed of cast steel and have been characterized by great weight. thus being objectionable in operation. The present invention seeks to provide an endless track construction, wherein the elements are so articulated as to afford a highly flexible type of track, as well as being light in weight and of great strength.

A further object of the invention is to provide a track of the above character, the elements of which are simple in construction and of such character as to adapt the track to be readily mounted and dismounted from the vehicle.

Further objects, not specifically enumerated above, will be apparent as the invention is described in greater detail in connection with the accompanying drawings, wherein.

Figure 1:
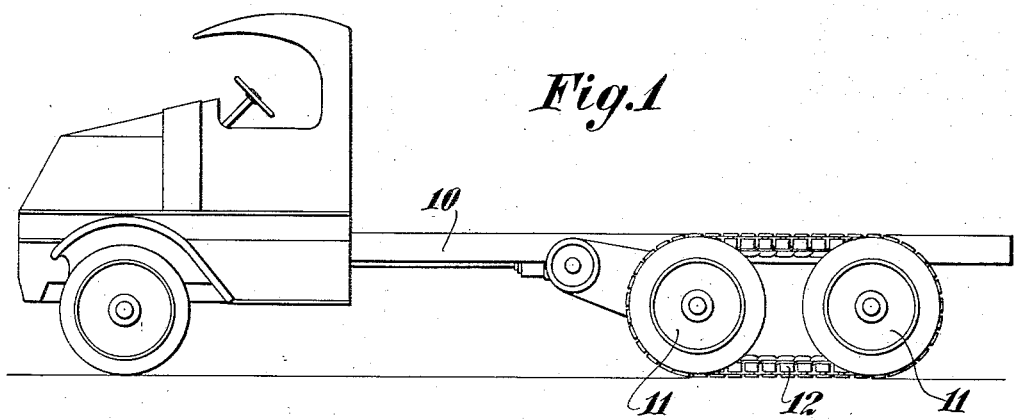
Figure 1 is a view in side elevation, showing a vehicle provided with a track constructed in accordance with the present invention.
Figure 2:
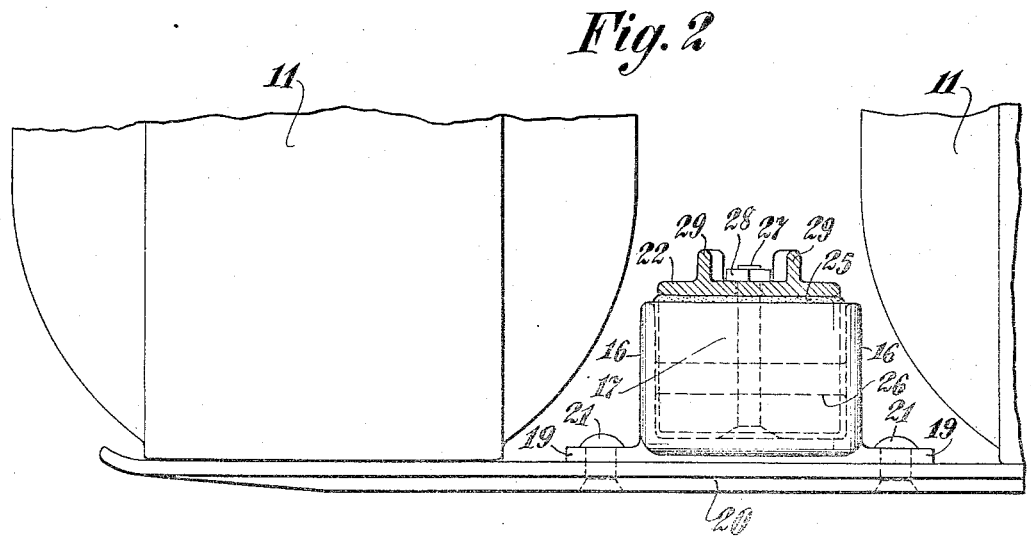
Figure 2 is a view in section, taken on line 2—2 of Figure 4, and looking in the direction of the arrows.
Figure 3:
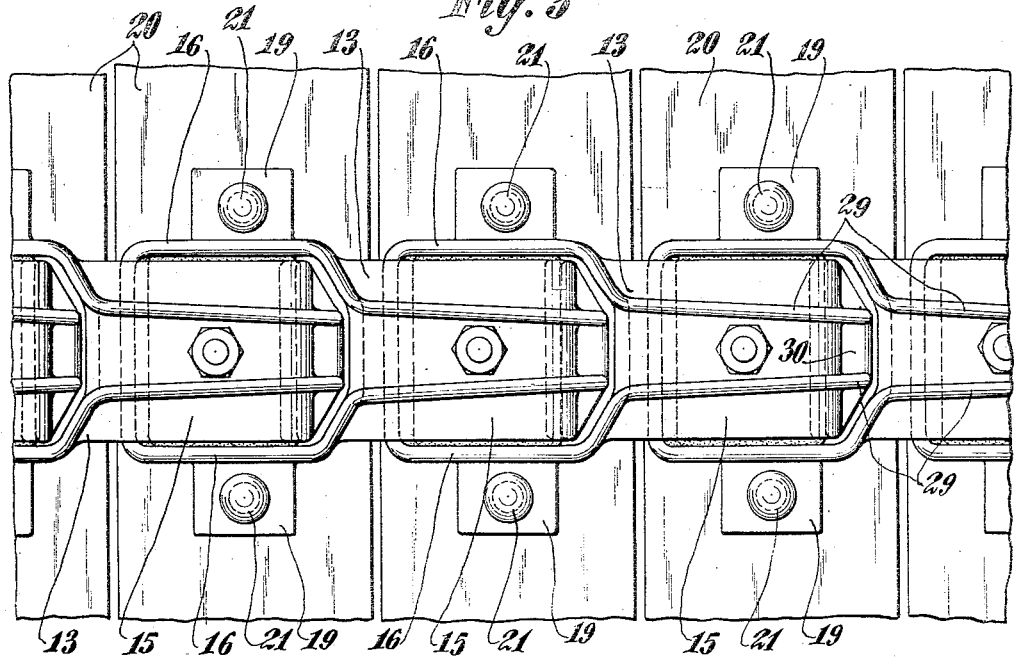
Figure 3 is an inner plan view showing a portion of the track shown in Figures 1 and 2.
Figure 4:
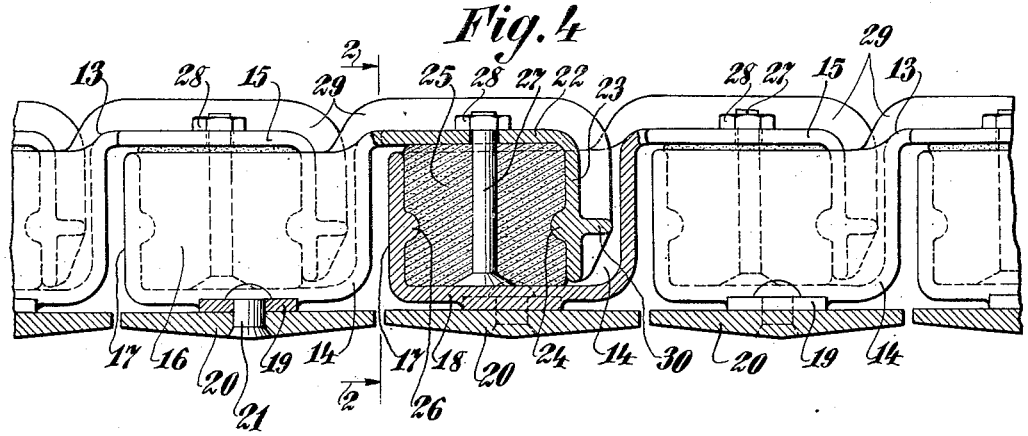
Figure 4 is a view in side elevation, partly broken away and in section, showing the track of Figures 1, 2, and 3.

Referring to the above drawings, a vehicle frame is shown at 10 having a plurality of wheels 11 upon each side thereof. One or both of these wheels may be driven and, if desired, only one wheel may be driven and the other wheel removably mounted on the frame in any well known fashion.

Over the wheels 11 at either side of the vehicle, an endless track 12 is mounted. The track is formed of a plurality of similar links 13 which are formed with recessed portions 14 and hook-shaped extensions 15. The recessed portions are provided with opposite side walls 16, and end wall 17 and a bottom wall 18. Upon the bottom wall oppositely extending arms 19 are formed which are secured to bearing pads 20 by means of rivets 21.

The cup-shaped extension is provided with a horizontal bearing surface 22 and a downwardly extending bearing surface 23. The last named bearing surface is formed with a longitudinal rib 24 which is adapted to engage a cooperating longitudinal groove in a rubber block 25. The end wall 17 is formed with a longitudinal rib 26, similar to the rib 24 and adapted to engage a similarly formed groove in the block 25.

A bolt 27 is carried by the bottom wall 18 of the recess 14 and is adapted to extend through an oversized aperture formed in the horizontal portion 22 of the extension 15. A nut 28 engages the bolt 27 and thus secures the respective portion 18 of one link to the cooperating extension 15 of an adjacent link. The extension 15 is preferably reinforced by providing strengthening ribs 29 which may converge slightly if desired and terminate in a transverse lateral rib 30.

In manufacturing and assembling the foregoing structure, it is preferable that the blocks of rubber taper in thickness from one side to the other so that the blocks will be thicker adjacent the inner sides than at the base or track pads. This will cause the track to assume normally an oval-shape and thus tend to force the pads outwardly to resist conformation to slight irregularities in the terrain over which the track passes.

From the foregoing description, it will be seen that the track is formed of a plurality of links, between which rubber cushioning elements are secured. The construction is such as to afford a high degree of flexibility in the track as well as reducing the weight thereof over existing forms without impairing the strength.

While the invention has been described with specific reference to the accompanying drawings, it is not to be limited, save as defined in the appended claims.

I claim as my invention:

1. An endless track for motor vehicles comprising a plurality of links each having a recess, blocks of yielding non-metallic material in the recesses, extensions on the links, downwardly extending portions on the extensions having seats for engaging the non-metallic material of recesses of adjacent links, and track pads secured to the bottoms of the recessed portions of the links.

2. An endless track for motor vehicles comprising a plurality of links each having a recess, blocks of yielding non-metallic material in the recesses, extensions on the links, downwardly extending portions on the extensions having seats for engaging the non-metallic material of recesses of adjacent links, interengaging portions on the blocks and the cooperating seats of the extending portions and the walls of the recesses, means to secure the extensions to the recessed portions of adjacent links, and track pads secured to the bottoms of the recessed portions of the links.

3. An endless track for motor vehicles comprising a plurality of links each having a recess, blocks of yielding non-metallic material in the recesses, hook-shaped extensions on the links, downwardly extending portions on the extensions having seats for engaging the non-metallic material of recesses of adjacent links, interengaging portions on the blocks and the cooperating seats of the extending portions and the walls of the recesses, means to secure the extensions to the recessed portions of adjacent links, and track pads secured to the bottoms of the recessed portions of the links.

4. An endless track for motor vehicles comprising a plurality of links each having a recess, blocks of yielding non-metallic material in the recesses, extensions on the links, downwardly extending portions on the extensions having seats for engaging the non-metallic material of recesses of adjacent links, interengaging portions on the blocks and the cooperating seats of the extending portions and the walls of the recesses, means passing through the blocks to secure the extensions to recessed portions of adjacent links, and track pads secured to the bottoms of the recessed portions of the links.

This specification signed this 5th day of January, A. D. 1931.

ALFRED F. MASURY.